United States Patent [19]

Heinzerling

[11] Patent Number: 4,870,331
[45] Date of Patent: Sep. 26, 1989

[54] CIRCUIT ARRANGEMENT FOR A PICTURE DISPLAY DEVICE FOR THE STABILIZATION OF THE SIZE OF THE PICTURE DISPLAYED

[75] Inventor: Paul H. Heinzerling, Brachbach, Fed. Rep. of Germany

[73] Assignee: U.S. Philips Corporation, New York, N.Y.

[21] Appl. No.: 262,913

[22] Filed: Oct. 25, 1988

[30] Foreign Application Priority Data

Nov. 25, 1987 [DE] Fed. Rep. of Germany ....... 3739923

[51] Int. Cl.$^4$ .............................................. H01J 29/70
[52] U.S. Cl. ..................................... 315/411; 358/243
[58] Field of Search ................. 315/411, 370; 358/243

[56] References Cited

U.S. PATENT DOCUMENTS 4,015,146  3/1977  Aihara et al. ...................... 307/304
4,131,843 12/1978  Koyama et al. ...................... 363/21
4,218,720  8/1980  Kam et al. ........................... 358/243

*Primary Examiner*—Theodore M. Blum
*Attorney, Agent, or Firm*—Edward W. Goodman

[57] ABSTRACT

Circuit arrangement for a picture display device for the stabilization of the size of the picture displayed.

In picture display devices having cathode-ray tubes, the first anode voltage for these tubes is recovered from the retrace pulse at a corresponding winding of the line transformer, this anode voltage source being of a relatively high ohmic value. As a result thereof, the anode voltage decreases versus an increasing anode current, and consequently, the picture displayed on the display screen becomes larger. More specifically, for picture display devices for word processing, which have a positive display, a very different anode current can flow because of different brightness settings. So as to produce nevertheless a largely constant anode voltage, a circuit arrangement which behaves as a negative resistance is provided at the lower end of the high-voltage winding. The circuit arrangement includes active elements and is supplied by the screen grid voltage, whose value is sufficient to compensate for anode voltage changes caused by changing anode currents.

4 Claims, 1 Drawing Sheet

CIRCUIT ARRANGEMENT FOR A PICTURE DISPLAY DEVICE FOR THE STABILIZATION OF THE SIZE OF THE PICTURE DISPLAYED

BACKGROUND OF THE INVENTION

1. Field of the Invention

The invention relates to a circuit arrangement for a picture display device having a cathode-ray tube whose final anode voltage is produced by a voltage source including a winding of a transformer and a rectifier connected to one end of the winding, the other end of the winding being coupled to a reference potential.

2. Description of Related Art

Picture display devices having cathode-ray tubes are generally known, for example, as television receivers or also as peripheral devices for computers for the processing of, for example, text and graphics. In these applications the high final anode voltage is recovered from the retrace pulses of the line transformer to which also the horizontal deflection coils are connected. A voltage source of this structure producing the final anode voltage has, however, a relatively high internal resistance. A variation of this voltage results, as is known, in a change of the size of the picture displayed on the display screen.

Picture display devices for connection to computers for, more specifically, word processing often operate on the so-called 'positive display' principle, i.e. the characters, such as letters, digits etc. are displayed in a dark color on a bright background, as is normally also the case on paper. Then substantially the major portion of the picture surface is brightly illuminated, so that an anode current of highly different values flows in the cathode-ray tube in dependence on the adjusted picture brightness.

Frequently used measures for stabilizing the picture size utilize a voltage source having a relatively high internal resistance to feed the deflection coils, from which also the final anode voltage is derived, so that at a higher anode current, also the amplitude of the deflection signal becomes less, but when the anode voltage changes also the geometry of the electron beam changes, more specifically the dot sharpness.

SUMMARY OF THE INVENTION

It is an object of the invention to provide a circuit arrangement of the type defined in the opening paragraph which produces a largely constant fixed anode voltage at different anode currents.

According to the invention, the circuit arrangement is characterized in that, arranged between the other end of the winding and the reference potential, a compensation circuit is inserted which behaves as a negative resistance whose value substantially corresponds to the value of the internal resistance of the voltage source without the compensation circuit.

Circuits for stabilizing voltages versus a changing current load are known per se; they are normally based on a control utilizing a comparison between the actual value and the desired value. As the anode voltage to be stabilized has a value of for example approximately 15 kV, stabilizing the voltage is obtained in the present invention by means of a different method, namely by the use of a compensation circuit having the characteristic of a negative resistance.

Consequently, the circuit arrangement according to the invention acts on the low-voltage end of the winding which produces the anode voltage. As a result thereof, the electronic components used are only loaded by the voltage differences to be compensated and not by the full 15 kV high voltage. Since, for a predetermined construction of the cathode-ray tube with its associated circuitry, the internal resistance of the anode voltage source is substantially predetermined, it is possible to obtain a significant stabilization of the anode voltage at different anode currents in a simple way by a corresponding dimensioning of the compensation circuit, the cost and design effort for the components being very low.

A compensation circuit which behaves as a negative resistance can only be assembled from active elements, which require a supply voltage. This supply voltage must exceed the maximum changes in the anode voltage which are to be compensated by the resistance circuit. Cathode-ray tubes, however, not only require a very high anode voltage, but also at least one voltage source for supplying a screen grid. An embodiment of the invention is characterized, in that the negative resistance circuit is constituted by a circuit arrangement comprising active elements which is supplied from a source for supplying a screen grid of the cathode-ray tube, which source is derived from the final anode voltage source. This screen grid voltage source is already always present and, when rated as is customary, has a voltage which exceeds the change in the anode voltage at different anode currents.

A simple implementation of the compensation circuit is characterized, in that the compensation circuit comprises a first series arrangement of a first transistor of a given conductivity type, a first resistor and a second transistor arranged between a supply voltage and a reference voltage, with which a second series arrangement comprised of a second, a third and a fourth resistor is arranged in parallel, the circuit point being connected to a reference voltage via a fifth resistor and the junction points of the second/third and third/fourth resistors being connected to the bases of the transistors, respectively, and the base of the second transistor constituting a terminal for the other end of the transformer winding. This implementation has the added advantage that only the first transistor must be designed for a high voltage, while the second transistor may be of a type having a low maximum collector-emitter voltage.

Another embodiment of the compensation circuit is characterized, in that a first series arrangement comprised of a first transistor of a given conductivity type, a first resistor and a second resistor is arranged between a supply voltage and a reference voltage, the base of the first transistor being connected via a third resistor to the supply voltage and via a second transistor of the same conductivity type to the junction point between the first and second resistors and the base of the second transistor being connected to the emitter of the first transistor via a fourth resistor and constituting a terminal for the other end of the winding. This embodiment requires still less cost and design effort.

BRIEF DESCRIPTION OF THE DRAWING

Embodiments of the invention will now be described in greater detail by way of example with reference to the accompanying drawing. Therein.

DESCRIPTION OF THE PREFERRED EMBODIMENTS

Figure 1:
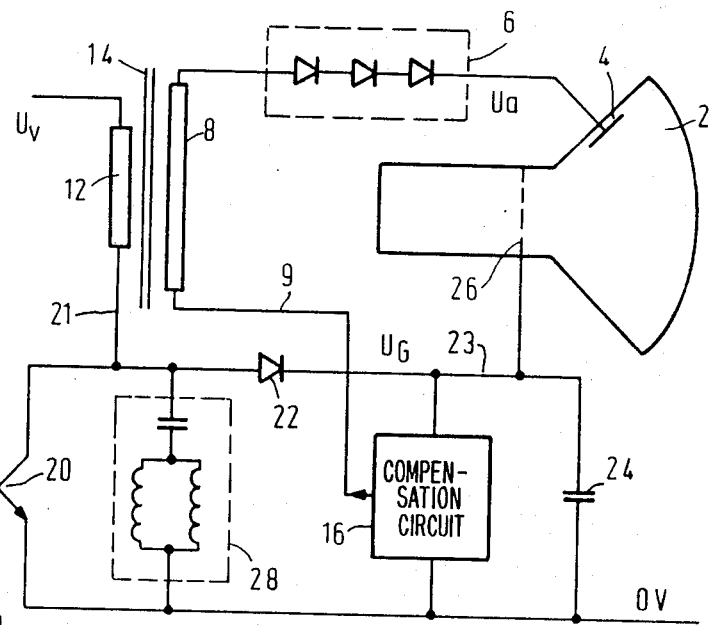
FIG. 1 shows those portions of a picture display device with a cathode-ray tube which are essential for the invention.

In the circuit arrangement shown in FIG. 1, the anode voltage $U_a$ of the final anode 4 of a cathode-ray tube 2 is produced by a rectifier cascade arrangement 6, which is connected to one end of a winding 8 of a transformer 14. In addition to other windings, not further shown, the transformer 14 has an input winding 12 one end of which is connected to a supply voltage $U_v$ and the other end via a line 21 to the collector of a switching transistor 20. This switching transistor 20 is driven by a signal of the horizontal frequency, and the deflection combination 28 for the horizontal deflection of the electron beam in the cathode-ray tube 2 is further connected to the line 21. When the switching transistor 20 is conductive, a current flows through the winding 12 and the horizontal combination 28 and produces a magnetic field. When the switching transistor 20 is rendered non-conductive, the decay of this magnetic field causes a high pulse voltage to be present at the upper end of the winding 8 which, via the rectifier cascade arrangement 6, supplies the anode voltage $U_a$. Simultaneously, a positive voltage pulse is produced on the line 21 which, via a diode 22, charges a capacitor 24 and consequently produces a voltage $U_g$ on a line 23, which voltage is applied to the screen grid 26 of the cathode-ray tube 2.

The lower end of the winding 8 is not directly connected to a reference voltage, but to an arrangement 16 which comprises active elements and is supplied by the screen grid voltage on the line 23. This arrangement 16 behaves, for the anode current flowing there from via a line 9, as a negative resistance, that is to say, the voltage on the line 9 becomes more positive versus an increasing anode current. Consequently, a portion of the screen grid voltage on the line 23 depending on the anode current is added with respect to the reference voltage O V. Thus, when the arrangement 16 is dimensioned correspondingly, the drop of the anode voltage $U_a$ versus the increasing anode current can be compensated for to the best possible extent.

Figures 2, 3:
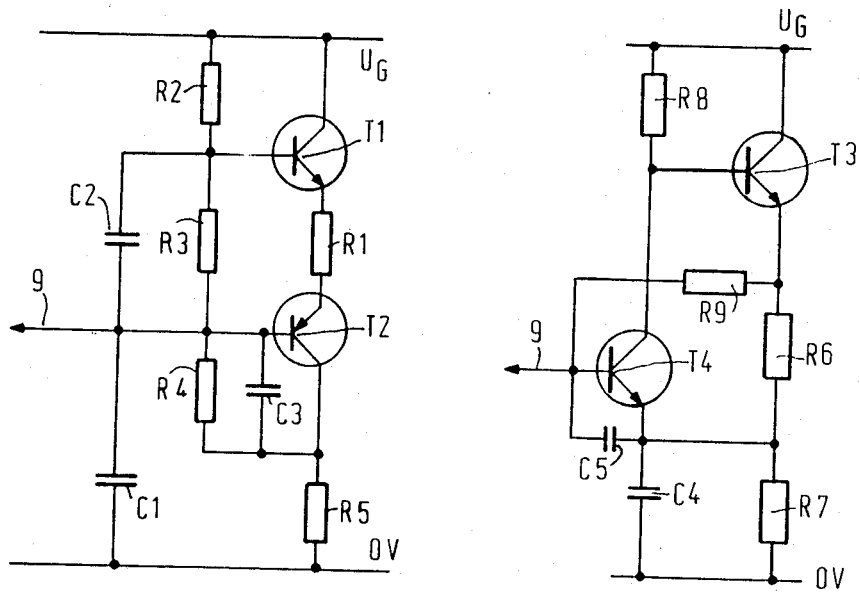
FIG. 2 shows an embodiment of a compensation circuit which behaves as a negative resistance.
FIG. 3 shows another embodiment of the compensation circuit.

Circuits which behave as a negative resistance are basically known and include, for example, an operational amplifier provided with resistors. The prior art circuits are however predominantly suitable for low voltages and require a significant cost and design effort for high voltages. FIG. 2 shows a simple compensation circuit which is suitable for use in the arrangement 16. This compensation circuit is provided between the supply voltage $U_G$ and the reference voltage O V with a first series arrangement consisting of an npn-transistor T1, a first resistor R1, a pnp transistor T2 and a further resistor R5. The resistor R1 interconnects the emitters of the two transistors T1 and T2. In addition, the circuit includes a further series arrangement of three resistors R, R3 and R4 provided between the supply voltage $U_G$ and the collector of the transistor T2. The junctions of these three resistors are each connected to the base of a transistor T1 and T2, respectively. The line 9 shown in FIG. 1 is connected to the base of the transistor T2. Furthermore, a capacitor C1 is provided between this connection point and the reference potential O V, which shunts the alternating current portion of the anode current. A capacitor C2 arranged parallel to the resistor R3 and also a further capacitor C3 between the collector and the base of the transistor T2 suppresses any tendency of the arrangement shown to oscillate.

When the anode current flowing via the line 9 becomes higher, the transistor T2 receives a higher base current and consequently also a higher emitter-collector current, which also renders the transistor T1 conductive to a greater extent. As a result thereof, the emitter-collector voltage of this transistor decreases, i.e. the emitter of the transistor T1 and consequently also the emitter of the transistor T2 assume a higher voltage, and as a result thereof also the voltage on the line 9 increases versus an increasing current. Thus, versus an increasing current on the line 9 a larger portion of the voltage $U_G$ is impressed. The connection terminal of the arrangement for the line 9 consequently behaves as a negative resistance. This arrangement has the further advantage that only the transistor T1 must be designed for a high voltage, while the transistor T2 may be a transistor having a low maximum emitter-collector voltage.

The following holds for the rating of the circuit elements:

R5 is the dominant factor for the power consumption of the circuit and must consequently be chosen with the highest possible value. On the other hand it must be so small that the cut-off currents for the two series arranged transistors do not produce a disturbing voltage drop. A value of, for example, 200 kOhm is a good compromise, which results in 1.25 W at 500 V.

At a permanent voltage difference of <200 V, the resistor R2 must supply a base current for T1 of a sufficiently high value to obtain an emitter current of 2.5 mA. For the relatively high collector voltage of 200 V a current gain of 60 can easily be guaranteed, so that a resistance of 5 MOhm is sufficient. The resistor R2 must have a highest possible value, as its forward current constitutes a preload for the resistor R5.

The resistors R1 and R3 form a negative feedback inter alia for the purpose of temperature stabilization, a value of 1.2 kOhm for R1 and 270 kOhm for R3 have proved to be effective.

The resistor R4 forms a current negative feedback for the amplifier and consequently determines the effective value of the negative resistance. Using the values specified for the remaining resistors a resistance value of R4=2 MOhm provides an effective (negative) resistance value of the compensation circuit of approximately --4 MOhm. Thus, a 100 μA increase in the anode current of the display tube results in an increase in the voltage on line 9 of approximately 400 V.

A further compensation circuit suitable for use in the arrangement 16 of FIG. 1 is illustrated in FIG. 3. This compensation circuit also comprises two transistors T3 and T4 which are both npn-transistors. The collector of the transistors T3 is connected to the positive supply voltage $U_G$, and the emitter is connected via the series arrangement of two resistors R6 and R7 to the reference potential, which here has a value of O V. The base of the transistor T3 is connected via a resistor R8 to the positive supply voltage UG and to the collector of the transistor T4, whose emitter is connected to the junction of the two resistors R6 and R7. The base of the transistor T4 is connected via a resistor R9 to the emitter of the transistor T3 and via a capacitor C5 to its emitter and in addition constitutes the connection point for the line 9 of FIG. 1. A further capacitor C4 is arranged parallel to the resistor R7. The capacitors take over the high-frequency alternating current portion of the anode current and suppress any tendency of the circuit to oscillate. When the current discharged via the line 9 increases, a larger portion of the current flowing across the resistor R9 to the base of the transistor T4 is derived, so that said transistor 14 becomes conductive to a lesser extent and the voltage drop across resistor R8 decreases. However, this causes the voltage at the emitter of the transistor T3 to increase and consequently also the voltage at the junction point of the resistors R6 and R7, which again has for its result that the voltage on the line 9 becomes more positive. The resistors are rated similarly to those in the circuit of FIG. 2, that is to say the resistor R8 has a very high value, while for the resistor R7, the remark made for the resistor R5 in FIG. 2 is also basically valid. The resistor R9 again represents a current negative feedback for the amplifier and mainly influences the effective value of the negative resistance.

It should be noted that alternatively, the negative grid bias voltage can be used as the reference voltage, to increase the voltage swing. In addition, the resistors R2 in FIG. 2 or R8 in FIG. 3, respectively, can be replaced by so-called bleeder resistors, which are nearly always provided in all commercially available high-voltage cascades.

What is claimed is:

1. A circuit arrangement for a picture display device having a cathode-ray tube, whose final anode voltage is produced by a voltage source including a winding of a transformer and a rectifier which is connected to one end of the winding, the other end of the winding being coupled to a reference potential, characterized in that, arranged between the other end of the winding and the reference potential a compensation circuit is inserted which behaves as a negative resistance whose value substantially corresponds to the value of the internal resistance of the voltage source without the compensation circuit.

2. A circuit arrangement as claimed in claim 1, characterized in that, the negative resistance circuit is constituted by a circuit arrangement comprising active elements, which is supplied from a source for supplying screen grid of the cathode-ray tube, which source is derived from the final anode voltage source.

3. A circuit arrangement as claimed in claim 2, characterized in that, the compensation circuit comprises a first series arrangement of a first transistor of a given conductivity type, a first resistor and a second transistor of the other conductivity type between a supply voltage and a circuit point, with which a second series arrangement comprised of a second, a third and a fourth resistor is arranged in parallel, the circuit point being connected to a reference voltage via a fifth resistor and the junction points of the second, third and fourth resistors being connected to the bases of the transistors, and the base of the second transistor constituting terminal for the other end of the transistor winding.

4. A circuit arrangement as claimed in claim 2, characterized in that a first series arrangement formed by a first transistor of a given conductivity type a first resistor and a second resistor is arranged between a supply voltage and a reference voltage, the base of the first transistor being connected via a third resistor to the supply voltage and via a second transistor of the same conductivity type to the junction point of the first and second resistors and the base of the second transistor being connected via a fourthresistor to the emitter of the first transistor and constituting a terminal for the other end of the winding.

* * * * *